United States Patent

Kaul

(12) United States Patent
(10) Patent No.: US 6,475,543 B2
(45) Date of Patent: Nov. 5, 2002

(54) YELLOW PIGMENTED FOOD PACKAGE

(75) Inventor: Bansi Lal Kaul, Biel-Benken (CH)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/872,805

(22) Filed: Jun. 2, 2001

(65) Prior Publication Data

US 2001/0034387 A1 Oct. 25, 2001

Related U.S. Application Data

(63) Continuation of application No. 09/448,100, filed on Nov. 23, 1999, which is a continuation of application No. 08/964,715, filed on Nov. 5, 1997, now abandoned.

(30) Foreign Application Priority Data

Nov. 7, 1996 (GB) .............................................. 9623231

(51) Int. Cl.$^7$ ......................... B65D 85/100; A23B 4/10; A23B 7/16
(52) U.S. Cl. ........................................ 426/106; 426/415
(58) Field of Search .................................. 426/106, 415

(56) References Cited

U.S. PATENT DOCUMENTS

| | | |
|---|---|---|
| 4,486,237 A | 12/1984 | Paffoni et al. |
| 4,594,411 A | 6/1986 | Henning |
| 4,732,570 A | 3/1988 | Baumgartner et al. |
| 5,047,517 A | 9/1991 | Deucker |
| 5,746,821 A | 5/1998 | Hays |

FOREIGN PATENT DOCUMENTS

| | | |
|---|---|---|
| CA | 2208742 | 12/1995 |
| DE | 2616981 | 10/1977 |
| DE | 4111348 | 10/1992 |
| EP | 841367 A2 * | 5/1998 |
| WO | WO 96/22333 | 7/1996 |

OTHER PUBLICATIONS

English Abstract for DE 2616981 A; Oct. 27, 1977.
English Abstract for DE 4111348; Oct. 15, 1992.
British Search Report for GB 9623231.9; Dec. 12, 1996.
EPO Search Report for EP 97810824; Dec. 16, 1998.
Whelan, "Polymer Technology Dictionary", Chapman & Hall, New York, p. 81 (1994).

* cited by examiner

*Primary Examiner*—Donald R. Wilson
(74) *Attorney, Agent, or Firm*—Anthony A. Bisulca

(57) ABSTRACT

Use of a pigment of the formula (I)

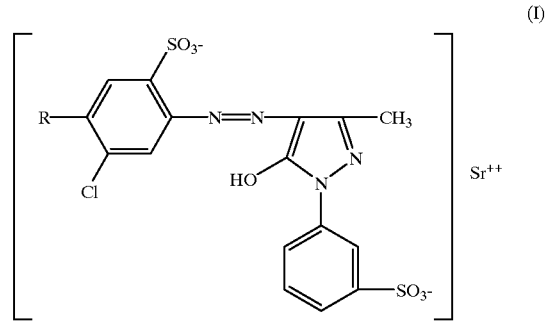

wherein R is chloro or methyl
as a colourant in plastics materials for food packaging.

9 Claims, No Drawings

YELLOW PIGMENTED FOOD PACKAGE

This application is a continuation application of copending application Ser. No. 09/448,100 filed on Nov. 23, 1999, now abandoned, which was a continuation of application Ser. No. 08/964,715 filed on Nov. 5, 1997, now abandoned.

This invention relates to the use of a certain pigment as an additive in plastics materials, in particular as an additive in plastics material used as packaging in the food industry.

Pigments according to formula

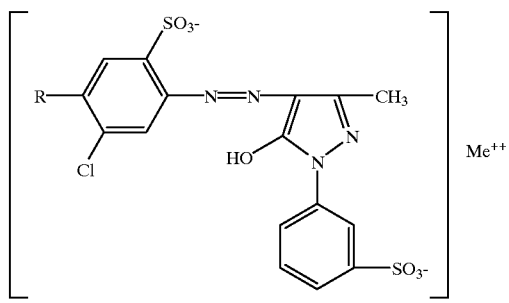

wherein R is chloro or methyl and Me$^{++}$ is strontium or calcium are known. They are yellow pigments and can be used as colourants in, for example certain plastics materials.

In particular, the calcium salt has been found to have a solubility in water of the order of 60 ppm. The low solubility of this compound in water is of practical importance in the field of dyeing synthetic fibres where wash fastness is an important requirement.

However, whereas a solubility of 60 ppm can be tolerated in the field of treating synthetic fibres, the contamination by coloured materials even at only a very low level is unacceptable when the contamination is of food products. It follows that the calcium salt is too soluble for application as a colourant in plastics packaging material where said packaging material is intended to come into intimate contact with aqueous media containing or consisting of foodstuffs.

There remains a need to provide a yellow pigment for colouring food packaging material with good light-fastness properties and which does not get extracted by liquid or water-containing foodstuff even after prolonged and intimate contact with said foodstuff.

Surprisingly we have now found that the strontium salt of the pigment of formula (I) exhibits a very low solubility in aqueous media which permits its use as a colourant for food packaging material which food packaging material is intended to come into prolonged and intimate contact with liquid and water-containing foodstuffs.

Accordingly the invention provides in one of its aspects the use of a pigment of the formula (I)

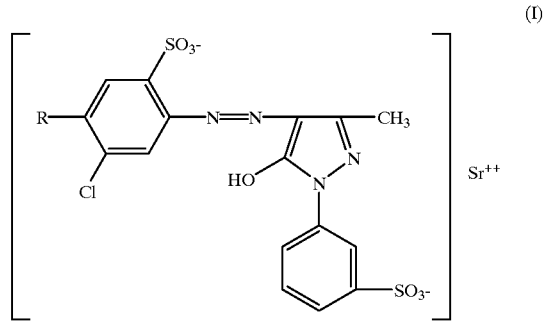

wherein R is chloro or methyl, preferably methyl
as a colourant in plastics packaging material which material is intended to come into prolonged and intimate contact with liquid or water-containing foodstuffs.

The strontium salt of the pigment can be formed by coupling the diazotised amine of the formula (II)

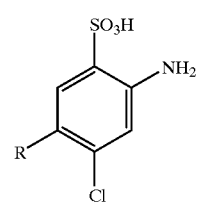

wherein R is as defined above
with a compound of the formula (III)

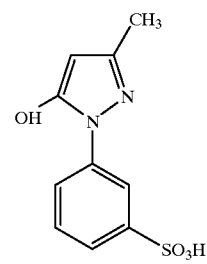

and converting the product so formed into the strontium salt.

The coupling reaction may be carried out by adding a solution or suspension of the diazonium salt dropwise to a heated aqueous mixture of the coupling component (III) which is dissolved by means of addition of alkali whilst keeping the reaction mixture at a slightly acidic pH, e.g. 6.0 to 6.5.

The pigment so formed is laked by adding to it a preferably water-soluble strontium salt, for example in the form of an aqueous solution and preferably heating the mixture to a slightly elevated temperature of 50 to 100° C.

The pigment of formula I may be obtained in a particularly soft-grained form by conducting the laking process in the presence of a surfactant, in particular a non-ionic or a cation-active surfactant. As surfactants there may be mentioned fatty amines having 8 to 18 carbon atoms, that is octyl, nonyl, decyl, undecyl, dodecyl, tridecyl, tetradecyl, pentadecyl, hexadecyl, heptadecyl and octadecyl amines or oleylamine, coconut fatty amine, and tallow amine, in particular straight chain amines listed herein-above.

Furthermore, base-substituted derivatives of fatty amines, for example coconut fatty propylenediamine and in particular tallow fatty propylenediamine are useful.

The pigment of formula (I) is a valuable yellow pigment which exhibits good heat and light stability. Its exceptionally low solubility in aqueous media, i.e. in the order of 10 to 20 ppm makes it eminently suitable as a colourant in plastics materials intended to form packaging material for foodstuffs and in printing inks for use in coating packaging material, e.g. tin cans. The pigment shows a particularly reduced tendency to rub off or migrate from or be extracted from those plastics materials selected from polyethylene, polypropylene, PVC, polystyrene, ABS and polycarbonate.

The tendency for the pigment to migrate, be extracted or rub-off from a given plastics packaging material is also dependent on the concentration of the pigment in the plastics mass. It has been found that there is a particularly low tendency to migrate, be extracted or rub-off plastics packaging material when the concentration of the pigment is in the range of 0.01 to 2 g per 100 g of plastics material, preferably 0 to 1 g per 100 g of plastics material.

A further factor affecting the extraction of the pigment from a plastic mass is the dispersibility of the pigment in the plastics material, i.e. the tendency of the material, to wet the pigment.

There now follows series of examples which serve to demonstrate the invention.

EXAMPLE 1

105.8 mg of a pigment of formula (I) wherein R is methyl (hereinafter referred to as (I)) are stirred in distilled water (15 ml) at room temperature for 24 hours. Thereafter any insoluble material is removed by centrifuge (4 hours at 4000 RPM) to leave a clear yellow solution.

A 1 centimeter path length quartz cell was filled with the yellow solution and the absorbance at $\lambda_{max}$ (360.6 nm) was measured on a Shimadzu UV-2101 PC spectrophotomer.

Thereafter, the extinction coefficient ($\epsilon$) of (I) was determined by placing a solution of (I) in DMSO (1 g/l) into a quartz cell of 0.1 cm path length and measuring the absorbance at $\lambda_{max}$ (398.6 nm) in a Shimadzu UV-2101 PC spectrophotomer.

With the extraction coefficient determined, the concentration of (I) in water is easily calculated using the Beer-Lambert law. $\epsilon = A.c.L$ wherein A is absorbance of (I) at $\lambda_{max}$; c is the concentration of (I) in water; and L is the path length (1 cm)

| $\epsilon_{DMSO}$ [1/g · cm] | Solubility (water) [mg/l] |
|---|---|
| 43.5 (398.6 nm) | 11.68 (390.6 nm) |

EXAMPLE 2

A coloured food-packaging material is made according to the following procedure: 1 part of (I) of Example 1 is blended with 99 parts of granular high density polyethylene polymer and the blend is melted at 270° C. to 280° C. whereby a coloured dispersion of compound (I) in the melt is formed. The melt is then extruded or blow-moulded to form plastic sheeting.

The plastic sheeting so formed has a bright yellow colouration and the pigment exhibits improved resistance to extraction by aqueous media from the plastic mass.

What is claimed is:
1. A food package comprising:
   a plastic containing a pigment of the formula (I),
   wherein R is chloro or methyl, and",

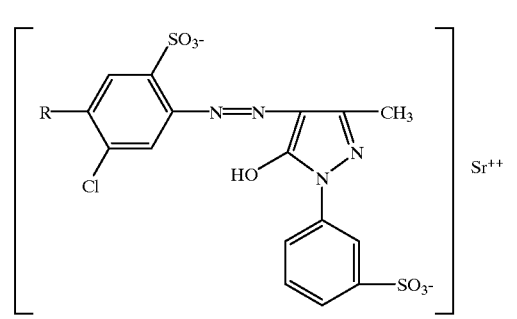

a foodstuff,
   wherein said pigment is present in a concentration sufficient to color said plastic, but will not be extracted or rub off when said plastic is in prolonged or intimate contact with the foodstuff.

2. The food package of claim 1, wherein said pigment is present in a concentration of between 0.01 g to 2.0 g per 100 g of said plastic.

3. The food package of claim 1, wherein said plastic is selected from the group consisting of polyethylene, polyproplylene, PVC, polystyrene, ABS, and polycarbonate.

4. A process for preparing a food package comprising the steps of:
   providing a plastic;
   mixing a pigment of the formula (I) with said plastic to form a mixture;

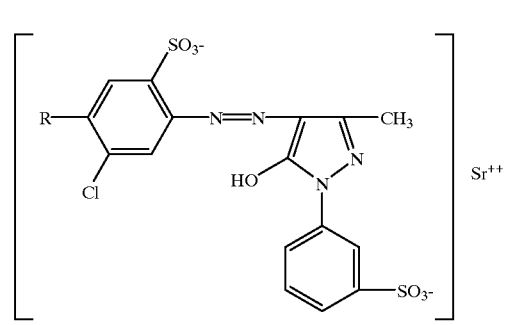

wherein R is chloro or methyl
   melting said mixture to form a melt;
   extruding or blow molding said melt to form a sheet; and
   packaging a foodstuff within said sheet.

5. The process of claim 4, wherein said pigment is present in a concentration of between 0.01 g to 2.0 g per 100 g of said plastic.

6. The process of claim 4, wherein said plastic is selected from the group consisting of polyethylene, polypropylene, PVC, polystyrene, ABS, and polycarbonate.

7. The process of claim 4, wherein said pigment is present in a concentration sufficient to color said plastic, but will not be extracted or rub off when said plastic is in prolonged or intimate contact with the foodstuff.

8. The process of claim 4, comprising the step of extruding said melt into a sheet.

9. The process of claim 4, comprising the step of blow molding said melt into a sheet.

* * * * *